United States Patent [19]
Goebel

[11] Patent Number: 5,361,162
[45] Date of Patent: Nov. 1, 1994

[54] NIGHT VISION DEVICE
[75] Inventor: Timothy R. Goebel, Tempe, Ariz.
[73] Assignee: Litton Systems, Inc., Woodland Hills, Calif.
[21] Appl. No.: 59,539
[22] Filed: May 11, 1993
[51] Int. Cl.$^5$ .............................................. G02B 27/02
[52] U.S. Cl. ..................................... 359/411; 359/412; 359/417; 359/418
[58] Field of Search ............... 359/407, 409, 411, 412, 359/417, 418, 400, 350, 351, 353, 354, 418–434, 600, 894; 2/442–447, 452, 453; 351/128

[56] References Cited
U.S. PATENT DOCUMENTS

| | | | |
|---|---|---|---|
| 2,659,266 | 11/1953 | Swisher | 2/453 |
| 4,205,894 | 6/1980 | Filipovich et al. | 359/400 |
| 4,449,787 | 5/1984 | Burbo et al. | 313/524 |
| 4,449,787 | 5/1984 | Burbo et al. | 359/410 |
| 4,463,252 | 7/1984 | Brennan et al. | 250/213 |

Primary Examiner—Loha Ben
Assistant Examiner—Thomas Robbins
Attorney, Agent, or Firm—Poms, Smith, Lande & Rose

[57] ABSTRACT

A binocular night vision device includes a pair of night vision monocular scopes which adjustably depend from a support frame in front of a user's eyes. The support frame includes an interpupillary distance adjustment mechanism which allows non symmetrical placement of the monocular scopes to better achieve binocular vision with depth perception. Also, the adjustment mechanism allows adaptive duplicative use of identically the same component parts of the device on both the left and right sides of the support frame so that the number of different parts required for the device is reduced.

27 Claims, 2 Drawing Sheets

NIGHT VISION DEVICE

BACKGROUND OF THE INVENTION

1. Field of the Invention

The present invention relates to a vision device, particularly to a night vision device. More particularly, the present invention relates to a night vision device of the ANVIS (aviator's night vision imaging system) type, including a pair of monocular night vision scopes which are mounted and associated with one another in such a way as to provide the user of the device with binocular vision, thereby allowing the user to enjoy a night-time view with depth perception.

2. Description of Related Art

A conventional binocular ANVIS night vision device is depicted in U.S. Pat. No. 4,449,787, issued 22 May 1984, to James Burbo, et al, (the '787 patent) in which a pair of monocular night vision scopes are carried upon a mounting assembly. This mounting assembly provides for vertical adjustment of the monocular night vision scopes, as well as their adjustment for tilt, eye relief, and symmetrical interpupillary distance of the user.

A deficiency of the night vision device taught by Burbo in the '787 patent is that the user of the device must symmetrically adjust the monocular night vision scopes to provide a proper interpupillary distance so that the user enjoys binocular vision and depth perception. Unfortunately, the helmet or face plate which carries the night vision device may not naturally set on the user's head centered between the user's eyes. Such may be the case for a variety of reasons including individual variations in the helmets used, as well as non symmetries of the user's head conformation. In this case, the user of the night vision device will not be able to achieve a completely satisfactory adjustment of the monocular scopes to provide binocular vision and depth perception.

In addition, as the helmet or face plate settles during a period of wearing, shifts about slightly with the movements of the user, or with vibrations of the helicopter or other aircraft on which the user is riding, the user will be distracted as the quality of binocular vision and depth perception changes. This variation in view can be very distracting in the stressful environment in which such night vision devices are used. The human factors engineering of devices which are to be used in such high stress environments where the safety of flight operations can be affected not only by the utility of a device but also by how convenient and easy to use, or "user friendly", the device is, can easily be appreciated Another ANVIS type of device which provides a night time view using both of the user's eyes and which provides for individual adjustment of interpupillary distance is seen in U.S. Pat. No. 4,463,252, issued 31 July 1984, to T. M. Brennan, et al, (the '252 patent). However, a night vision device according to the '252 patent includes only a single image intensifier assembly. The view provided to each of the user's eyes is a respective right or left half of the image provided by this singular image intensifier assembly. Consequently, the device according to the '252 patent cannot provide true binocular vision with depth perception.

Yet another conventional binocular night vision device is known as the ANVIS 6 in which a pair of night vision monoculars are suspended in front of the user's eyes by a frame which is rectangular in plan view. The frame is supported from a face plate or helmet which the user wears in order to support the weight of the night vision device. The conventional ANVIS 6 includes an interpupillary distance adjustment mechanism with a pair of transversely aligned rotatable shafts, each drivingly coupled to the other at adjacent ends thereof, and each extending within the rectangular frame above one of the monocular scopes. Each shaft defines a respective thread portion of opposite hand, and the rectangular flame slidably carries a pair of depending monocular mounts each threadably engaging one of the threaded shafts. One of the threaded shafts includes an outwardly projecting knob rotation of which rotates both shafts and simultaneously moves the monocular mounts symmetrically together or apart to adjust interpupillary distance to the preferences of the user.

The conventional ANVIS 6 also includes a tilting mechanism which includes an elongate eccentric bushing device which is rotatable in the rectangular frame. This rotatable bushing carries the threaded shafts of the interpupillary adjustment mechanism, and moves these shafts in an arcuate path to tilt the monocular mounts relative to the rectangular frame about a slide and pivot shaft which is carried also by this frame.

With the interpupillary adjustment mechanism of the ANVIS 6, the user is also constrained to a symmetrical positioning of the night vision monocular. Also, each of the monocular mounts must be a separate piece, as are the two threaded shafts. This requirement for separate pieces increases the manufacturing costs of the ANVIS 6, while also increasing the logistics burden for repair and maintenance of the device.

SUMMARY OF THE INVENTION

In view of the above, a primary object of the present invention is to provide an ANVIS type of binocular night vision device with a pair of night vision monocular scopes and in which the night vision monoculars are individually adjustable for interpupillary distance relative to the user's head and eyes.

Another object of the present invention is to provide such a night vision device in which the interpupillary distance adjustment mechanism provides for non symmetrical placement of the night vision monocular relative to the user's head.

Still another object for the present invention is to provide a night vision device allowing independent interpupillary adjustment of the night vision monocular scopes relative to one another.

An additional object for this invention is to provide a binocular night vision device in which the interpupillary adjustment mechanism employs the same parts at both the left and right eyes of the user.

Yet another object for this invention is to provide a night vision device of the above-described character in which the interpupillary adjustment mechanism uses a pair of parts both made to a single part design at both the left and right sides of the mechanism, which single part by its design adapts the part for two different installations so that the tilting mechanism of an otherwise conventional ANVIS 6 night vision device is preserved with the use of the present invention, while at the same time allowing non symmetrical placement of the night vision monocular.

Another object is to provide apparatus supporting a monocular vision device relative to a user's head and eyes and which allows the vision device to be suspended in front of either of the user's eyes according to preference and to be latterally adjustable for allignment with the preferred eye of the user.

Accordingly, the present invention provides a night vision device with a frame supported relative to a user's head and eyes, a pair of night vision monocular scopes depending from the frame in front of the user's eyes, and means for non symmetrical interpupillary adjustment of said monocular scopes relative said frame.

More particularly, the present invention provides an ANVIS 6 night vision device with an interpupillary adjustment mechanism allowing independent lateral positional adjustment of the night vision monocular scopes of the device relative to the user's head and eyes.

Still more particularly, the present invention provides an ANVIS 6 type of night vision device with the above described independent positional adjustment capability of the night vision monocular, which independent adjustment capability is achieved with use of the same adjustment parts at both the right and left sides of the device, thereby reducing the number of separate part designs required for the device.

Additional objects and advantages of the present invention will be apparent from a reading of the following description of a particularly preferred exemplary embodiment of the invention taken in conjunction with the following drawing Figures, in which:

DESCRIPTION OF A PREFERRED EMBODIMENTS

Figure 1:
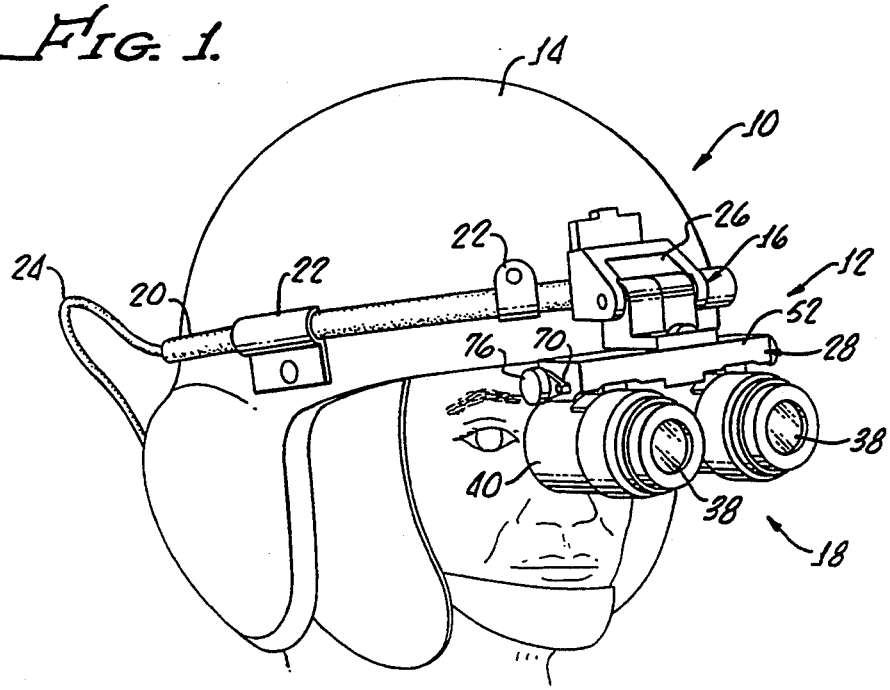
FIG. 1 is a fragmentary perspective view of a human wearing a helmet upon which is carried a night vision device.
Figure 2:
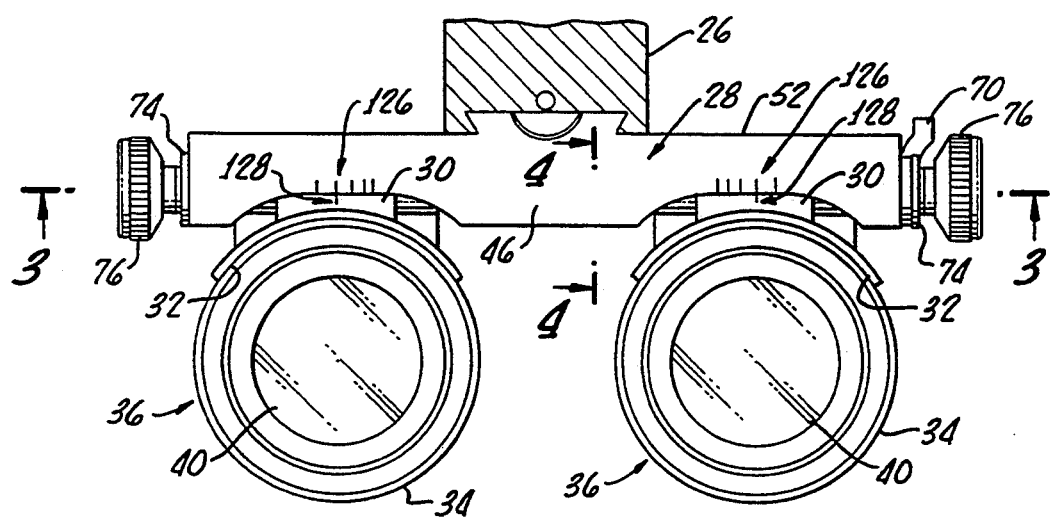
FIG. 2 is a rear view of the night vision device seen in FIG. 1.

FIG. 1 shows a human 10 wearing a night vision system 12 which includes a helmet 14, a night vision device mount 16, and a night vision device 18. The night vision device mount 16 includes a halo-like structure 20 which is secured to the helmet 14 by plural spaces apart brackets 22. A power source (not shown) is connected with the mount 16 by a cable 24, and provides electrical power to operate the night vision device 18. Mount 16 also includes a centrally located bracket 26 which provides for vertical adjustment of the night vision device 18 relative to the helmet 14. Those ordinarily skilled in the pertinent arts will recognize that the helmet 14 is only one of several alternative support devices which the user 10 may employ to support the night vision device 18 in front of the user's eyes. For example, the user could just as well use a face plate or skull pad type of support device, both of which are well known in the pertinent arts, both of which are fully equivalent to the helmet 14 in respect to support of the night vision device 18. The night vision device 18 includes a frame 28 which secures to and depends from the central bracket 26. This frame 28 is of laterally elongate rectangular shape in plan view, and is also of generally rectangular shape in both frontal and side elevation views. Depending from the frame 28 is a pair of spaced apart mounts 30 (best seen viewing FIG. 2), which at their lower extent define saddle-shaped receptacles 32 for receiving the cylindrical outer surface 34 of respective night vision monocular scopes 36. As FIGS. 1 and 2 in conjunction depict, the night vision monocular 36 at their forward ends each include an objective lens 38 by which low level light from a night-time scene is received. At their aft ends, the night vision monocular scopes 36 each include a respective eyepiece 40 from which they provide to the user 10 an intensified image of the night-time scene.

Figure 3:
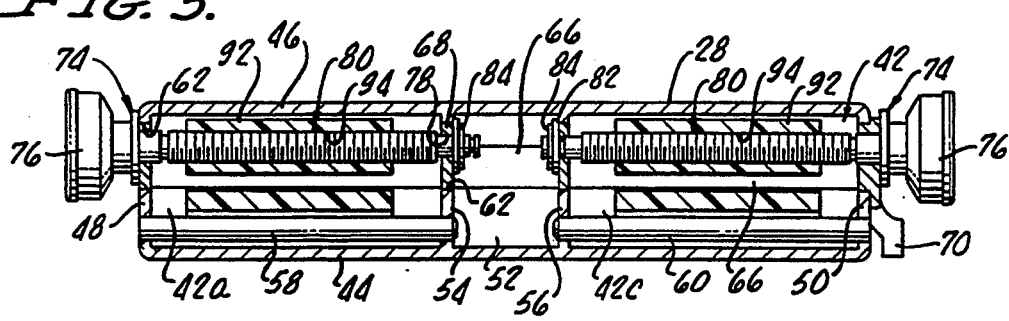
FIG. 3 is a partial cross sectional view taken along line 3—3 of FIG. 2.

In order to allow adjustment of the horizontal spacing between the monocular scopes 36 to match the interpupillary distance of the user 10, as well as allowing tilting of these scopes together in a vertical plane, the frame 28 defines a downwardly open recess 42, which is best seen viewing FIG. 3. This recess 42 is cooperatively defined by front, back, left, and right side walls, referenced with the numerals 44, 46, 48, and 50, respectively, which depend vertically from a top wall 52. A pair of centrally located and spaced apart interior partition walls 54, 56 divide the recess 42 into subparts which are referenced with the numerals 42a, 42b, and 42c.

Near the front of the frame 28, the partition walls 54, 56, in respective cooperation with the side walls 48, 50 carry a pair of slide and pivot shafts 58, 60, in the recess parts 42a, and 42c. In order to illustrate that each of the side walls 48, 50, and partition walls 54, 56, defines a respective one of four aligned bores (each referenced with the numeral 62), the side wall and partition wall at the left side of the frame 28 have been sectioned down to these bores as seen in FIG. 3.

Rotatably received in the bores 62 is an elongate eccentric bushing member 64. This bushing member 64 includes a thin elongate blade portion 66, and four eccentric bushing portions, each referenced with the numeral 68. The bushing portions 68 are received rotatably in the bores 62. To locate the bushing member 64 laterally in the frame 28, a pivot lever portion 70 of the bushing member 64 extends outwardly of the frame 28, and defines a shoulder 72 bearing externally on the side wall 50. A flange portion 74 of a right-side control knob assembly 76R captures the pivot lever 70 between the flange portion 74 and the wall 50. Similarly, at the left side of frame 28, a flange portion 74 of a respective left-side control knob assembly 76L bears against the left side wall 48. Consequently, the eccentric bushing member 64 cannot move out of the bores 62.

Rotatably received in respective left and right pairs of the bushing portions 68 of the bushing member 64 at aligned bores 78 thereof is a pair of essentially identical control shaft assemblies 80L and 80R. These control shaft assemblies respectively include the control knobs 76L and 76R. The aligned bores 78 are located eccentrically with respect to the bushing portions 68. In the recess portion 42b, each control shaft assembly 80 carries a washer member 82 which is secured axially on the control shaft by an E-type of retaining ring 84. In order to control friction levels in the mechanism, the washers 82 are preferably made of a polymer material with an inherently low coefficient of friction and good dry lubricity. Preferably, the washers 82 are fabricated of polytetrafluoroethylene, commonly known under the name, Teflon. Alternatively, a Nylon, Delrin, or other type of lubricous polymer material may be used in making the washers 82. The washer members 82 bear on the respective bushing portion 68 of the bushing member 64 to prevent the control shaft assemblies 80 from moving outwardly of the bores 78.

Additionally, the washer members 82 are of sufficient diameter that they bear also on the respective partition walls 54, 56, to prevent the eccentric bushing member 64 from moving laterally in the frame 28. Consequently, lateral forces on the control shaft assemblies are transferred by the flanges 74 and washers 82 to the respective side and partition walls, and the eccentric bushing member 64 need not transfer these lateral forces through the thin elongate blade portion 66. However, it should easily be understood that the entire eccentric bushing member 64 is rotatable in the frame 28 in order to move the control shaft assemblies together through an arcuate path 86, which is best seen viewing FIG. 4. The thin elongate blade portion 66 of the eccentric bushing member 64 is easily able to sustain the torque required for this pivotal movement, and a pin portion (not shown) extends from the pivot lever 70 into an arcuate slot of the frame 28 to limit the extent of this pivotal movement to about eighty degrees of arc.

Figure 4:
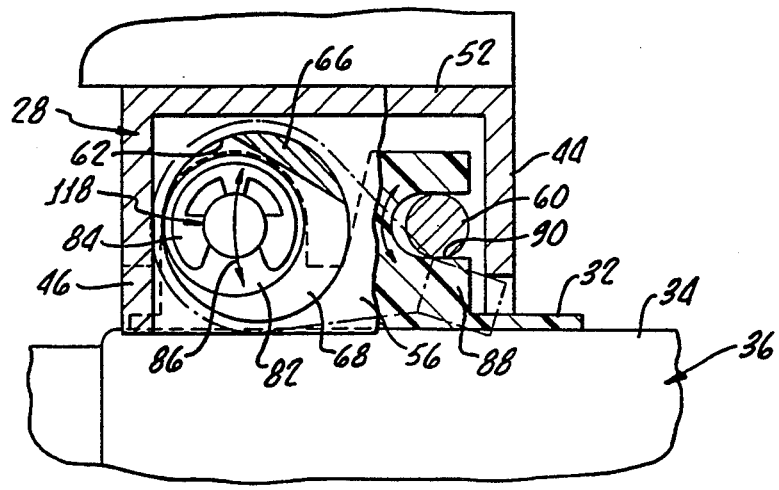
FIG. 4 is an enlarged cross sectional view taken at line 4—4 of FIG. 3.
Figure 5:
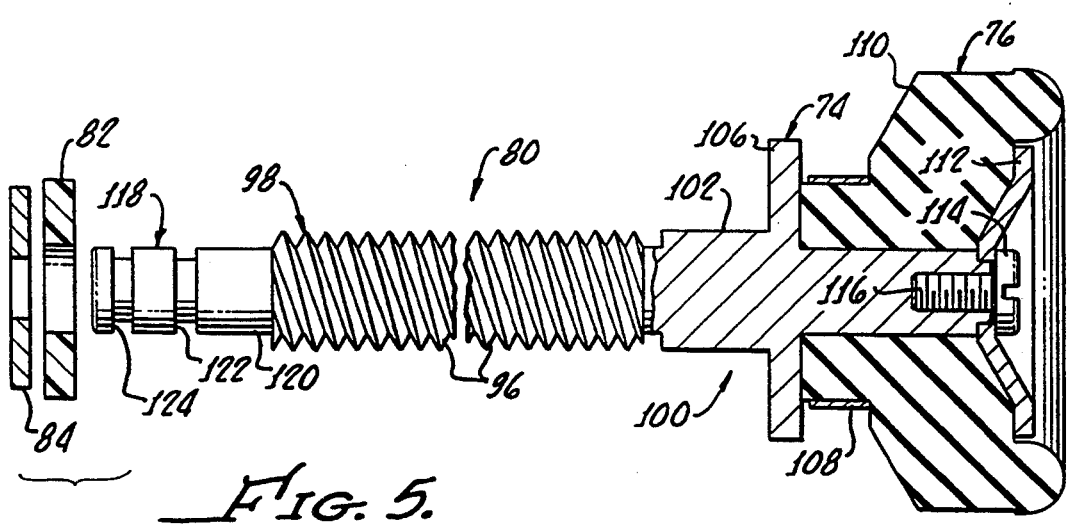
FIG. 5 is an exploded and partially cross sectional view of components of the device seen in the other drawing Figures, and is presented at a considerably enlarged scale in order to better depict details of construction.

As is best understood by viewing FIGS. 3, 4, and 5 in conjunction, the night vision device 18 includes a pair of essentially identical mounts 30 which are slidably movable and are pivotal in the frame 28 on the slide and pivot shafts 58 and the control shaft assemblies 80. That is, each mount 30 includes a forward laterally elongate boss portion 88 which defines a laterally elongate and forwardly opening slot 90. The bosses 88 are slidably and pivotally received on the respective one of pins 58, 60 to allow substantially only sliding and pivoting motion relative to the frame 28. In other words, the fit of pins 58, 60, in the slots 90 is sufficiently close that side to side rocking of the mounts 30 does not occur.

Rearwardly of the boss 88, each mount includes a rear boss 92, which defines a laterally extending threaded bore 94 threadably receiving the control shaft assembly 80 at a thread defining portion 96 thereof. Because each of the control shaft assemblies 80 are substantially identical, the bores 94 are each provided with a tread of the same hand. Preferably, the hand of the thread portion 96 and of bore 94 is right-handed. Thus, it is easily understood that the mounts are movable laterally for interpupillary positional adjustment by rotation of the respective control knob 76. Additionally, the mounts 30 are pivotal together by pivoting of the lever portion 70.

Attention now to FIG. 5 in particular will show that each of the essentially identical control shaft assemblies 80 includes an elongate shaft portion 98 which defines the thread portion 96. The thread portion 96 of each of the control shaft assemblies 80 defines a multi-start thread of the same hand so that the mounts 30 on both the left and right side of the frame 28 are essentially the same. That is, these mounts are made to the same design and include bores 94 threaded with the same hand of multi-start thread to match the thread portions 96 of the control shaft assemblies 80. Adjacent to one end of the thread portion 96, the shaft portion 98 includes an integral collar 100 of enlarged diameter which defines both a bearing surface 102 which is rotatable in a respective one of the bores 78 of eccentric bushing member 64, and a shoulder 104 against which a washer member 106 is captured. The washer member 106 defines the flange portion 74 for the control knob assembly 80. The remaining parts of the control knob assembly 80 include a spacer 108 which is interposed between the washer member 106 and a molded elastomer traction disk 110. This traction disk along with a retaining member 112 and the engagement of the traction disk with spacer 108 provides torque transfer from a user's fingers to the shaft portion 98. A screw 114 is threadably received into an axial bore 116 to capture the washer member 106, spacer 108, traction disk 110, and retention member 112, on the shaft portion 98. At its end opposite the control knob assembly 80, the control shaft portion 98 defines a reduced diameter stem portion 118. This stem portion 118 defines a bearing surface 120 which is rotatably received in a respective one of the bores 78 of the bushing member 64. Beyond the bearing surface 120, the stem portion 118 defines a pair of spaced apart grooves 122, 124, either one of which may receive the E-ring clip 84.

In order to compensate for the thickness of the lever portion 70 of the bushing member 64 at the right-hand side of the frame 28, the control shaft assembly 80 is installed with the E-ring clip 84 in the groove 124. On the other hand, on the left-hand side of the frame 28, an identical control shaft assembly 80 is installed with the E-ring clip 84 in the groove 122. Thus, the identical control shaft assembly by its configuration allows its installation in either one of two alternative configurations. Also, the control shaft assemblies 80 are identical on each side of the frame 28 so that the mounts 30 may also be the same. The result is a significant decrease in the manufacturing costs for the night vision device 18, as well as a reduction in the number of different parts required to be kept on hand for maintenance and service of the device.

In view of the above, it is easily understood that the interpupillary distance defined between the centers of the eyepieces 40 is adjustable by turning the control knobs 76. Additionally, this interpupillary distance need not be symmetrically arranged on either side of the center of the frame 28. That is, if the user 10 wishes, the interpupillary distance between the monocular scopes 36 may be asymmetrical relative to the frame 28 and the helmet or face plate which the user wears to support the night vision device. Thus, in those instances where the helmet or other support device does not repose in a position centered with respect to the user's eyes, the user nevertheless can achieve a satisfactory positioning of the monocular scopes 36, and resulting binocular vision. In order to assist the user in this respect, the frame 28 at its rear surface (best seen in FIG. 2) defines respective left-eye and right-eye indicia, indicated with the arrowed reference numeral 126, while the mounts 30 include an index mark 128. By use of these indicia and marks, the user 10 may adjust the interpupillary distance and non symmetrical disposition of the scopes 36 relative to the frame 28.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. For example, because the invention as depicted and described is particularly adapted to provide the apparatus and structural advantages of the invention with an ANVIS 6 type of night vision device, a pair of the parts shown in FIG. 5 (i.e., the control shaft assemblies 80), along with one additional mount member 30 having a right-hand thread (one of the original mounts of an ANVIS 6 already being provided with a right-hand thread, while the other mount has a left-hand thread) could be employed as a retrofit kit for presently existing ANVIS 6 binocular night vision devices. Also, the invention may be used to support a viewing device for day or night viewing and of monocular type in front of a user's left or right eye according to preference. This leaves the user's other eye unobstructed for normal unaided sight, while the invention provides for very convenient lateral adjustment of the monocular viewing device for best alighnment with the user's preferred eye. That is, the invention may be used with only one of two possible monocular scopes mounted to the frame so that the other eye of the user is unobstructed, and the monocular scope is easily adjustable laterally relative to the user's preferred eye.

The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A viewing apparatus comprising:
   a frame for being supported relative to a user's head and eyes;
   said frame supporting a pair of night vision monocular scope mounts for lateral relative movement;
   said pair of scope mounts carrying a respective left-eye and right-eye night vision monocular scope disposed in front of said user's eyes for cooperatively providing binocular vision, and defining therebetween an interpupillary distance;
   said frame carrying means for laterally moving and positioning said monocular scope mounts relative to said frame to adjust said interpupillary distance, said moving and positioning means including a pair of respective laterally-extending threaded shaft members journaled by said frame and each threadably associated with a respective one of said pair of scope mounts to move the latter laterally of said frame in response to rotation of said shaft member, and said pair of shaft members being substantially identical with one another.

2. The invention of claim 1 wherein said pair of threaded shaft members each define a thread section of the same direction.

3. The invention of claim 1 wherein each of said pair of threaded shaft members includes an elongate stem portion journaled in said frame, said stem portion defining a circumferential groove, a washer member received on said stem portion adjacent a wall of said frame to bear thereagainst, and a clip member engaging said groove to trap said washer member between said clip member and said frame wall.

4. The invention of claim 3 wherein said washer member is of polymer material.

5. The invention of claim 4 wherein said polymer material is polytetrafluoroethylene.

6. The invention of claim 3 wherein said clip member is an E-ring type.

7. The invention of claim 3 wherein said stem portion defines a second groove like and spaced from said first-recited groove to define a pair of grooves.

8. The invention of claim 7 wherein one of said pair of shaft members is installed in said frame with said clip member disposed in one of said pair of grooves, and the other of said pair of shaft members is installed with the clip member in the other of said pair of grooves.

9. The invention of claim 1 wherein said night vision device is an ANVIS 6 type.

10. The invention of claim 1 wherein said frame includes an interpupillary indicia disposed with respect to each of said pair of scope mounts, and each of said pair of scope mounts includes a respective index mark associated with said indicia.

11. A binocular night vision device comprising a frame supported relative to a user's head and eyes, a pair of night vision monocular scopes depending from said frame in front of the user's eyes, and means for non symmetrical interpupillary distance adjustment of said pair of monocular scopes relative to said frame.

12. The invention of claim 11 further including a pair of substantially identical laterally extending interpupillary distance control shafts journaled in said frame and threadably associating with a respective one of said monocular scopes.

13. The invention of claim 12 wherein each of said control shafts includes an elongate thread portion, a control knob assembly at one end of said thread portion, and an elongate stem portion at an opposite end of said thread portion, said elongate stem portion defining a pair of spaced apart grooves.

14. The invention of claim 13 wherein each of said pair of control shafts carries an washer member bearing axially against said frame, and a retaining clip member received in one of said pair of grooves.

15. The invention of claim 14 wherein said washer member is make of a polymer material.

16. The invention of claim 15 wherein said washer is made of polytetrafluoroethylene.

17. The invention of claim 14 wherein one of said pair of control shafts carries said clip member in one of said pair of grooves, while the other of said pair of control shafts carries said clip member in the other of said pair of grooves.

18. An ANVIS 6 type binocular night vision device with a pair of monocular night vision scopes cooperatively defining an interpupillary distance, and an interpupillary distance adjustment mechanism allowing independent lateral positional adjustment of the night vision monocular scopes of the device relative to a user's head and eyes.

19. The ANVIS 6 night vision device of claim 18 wherein said independent interpupillary distance adjustment capability is achieved with use of the identical adjustment parts at both the right and left sides of the device, thereby reducing the number of separate part designs required for the device.

20. A retrofit kit for an ANVIS 6 type of binocular night vision device including a frame supporting a pair of monocular night vision scope mounts, and a monocular night vision scope disposed on each of said mounts to cooperatively provide binocular vision with depth perception, said retrofit kit providing for independent positioning of said scopes relative said frame to cooperatively define an interpupillary distance between eyepieces of said scopes, which interpupillary distance may be asymmetrically disposed relative said frame, said retrofit kit comprising:
   a pair of substantially identical interpupillary distance control shaft assemblies each adapted to be journaled by said frame and to threadably associate with a respective one of said scope mounts, each control shaft having a thread portion of the same direction, and a replacement scope mount adapted to replace one of said pair of scope mounts of said ANVIS 6 night vision device, said replacement scope mount having a threaded bore of the same direction and threadably engageable with one of said pair of control shaft assemblies.

21. A viewing apparatus comprising:

a frame for being supported relative to a user's head and eyes;

said frame supporting a monocular viewing device for being disposed in front of a selected one of said user's eyes, said frame further carrying means for laterally moving and positioning said viewing device to align the latter with said selected eye of the user, said moving and positioning means including a respective mount slidably carried on said frame for supporting said viewing device and a laterally-extending threaded shaft journaled by said frame, threadably engaging said mount to move the mount laterally in response to rotation of said threaded shaft and traversing only said selected eye of said user; whereby lateral movement of said viewing device to align with said selected user eye is independent of lateral movement of another such viewing device mount which may be carried by said frame forwardly of the other of said user's eyes.

22. The invention of claim 21 wherein said frame carries a pair of said mounts each for being disposed forwardly of a respective eye of said user, and a pair of independent threaded shafts each journaled by said frame and threadably engaging a respective one of said pair of mounts.

23. The invention of claim 22 wherein said pair of threaded shafts are substantially identical with one another.

24. The invention of claim 22 wherein said pair of mounts are substantially identical with one another.

25. The invention of claim 22 wherein each of said pair of threaded shaft members includes an elongate stem portion journaled in said frame, said stem portion defining a circumferential groove, a washer member received on said stem portion adjacent a wall of said frame to bear thereagainst, and a clip member engaging said groove to trap said washer member between said clip member and said frame wall.

26. The invention of claim 25 wherein said stem portion defines a second groove like and spaced from said first-recited groove to define a pair of grooves.

27. The invention of claim 26 wherein one of said pair of shaft members is installed in said frame with said clip member disposed in one of said pair of grooves, and the other of said pair of shaft members is installed with the clip member in the other of said pair of grooves.

* * * * *